Dec. 23, 1941.  H. F. WILEY  2,266,837
METHOD AND APPARATUS FOR TRANSLATING SEISMIC WAVES
Filed July 24, 1939
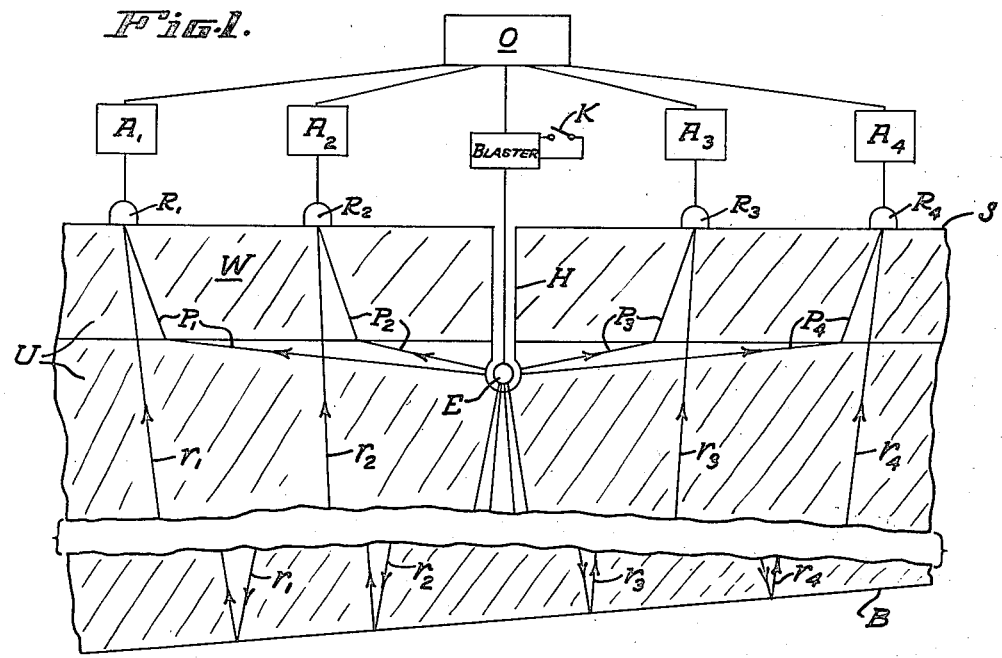
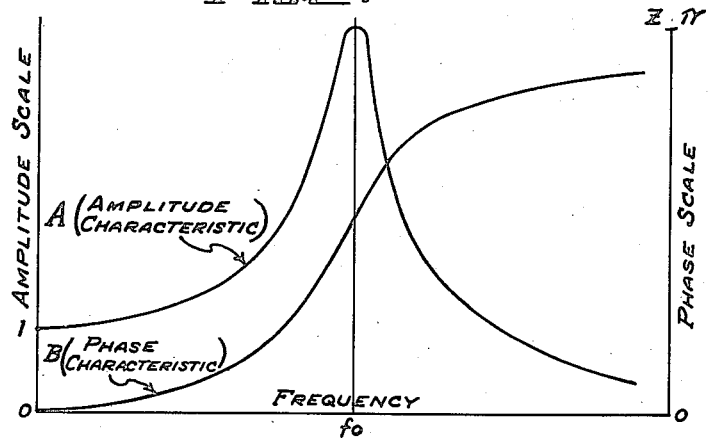
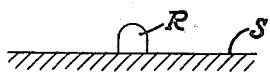
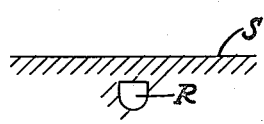
INVENTOR.
HAROLD F. WILEY
BY
ATTORNEYS.

Patented Dec. 23, 1941

2,266,837

UNITED STATES PATENT OFFICE 2,266,837

METHOD AND APPARATUS FOR TRANSLATING SEISMIC WAVES

Harold F. Wiley, Pasadena, Calif., assignor, by mesne assignments, to Consolidated Engineering Corporation, Pasadena, Calif., a corporation of California Application July 24, 1939, Serial No. 286,177

6 Claims. (Cl. 181—0.5)

The present invention pertains to seismic prospecting and in particular to a method and apparatus especially suitable for translating seismic waves into corresponding electrical waves without the introduction of erratic phase and amplitude variations beyond the control of the operator due to the mechanical interaction of the earth and the seismometers used to receive the seismic waves.

In conducting seismic explorations, it is customary to generate seismic waves at a point beneath the earth's surface, to receive the seismic waves at a plurality of spaced points on the earth, and to convert the received seismic waves into corresponding electrical waves by means of seismometers. The difference in wave arrival time of a wave reflected from a given reflecting horizon is customarily used as a basis for computing the dip of said reflecting horizon.

The accuracy with which subsurface structures may be determined also depends to a large extent on the ability to identify waves from a common horizon on records corresponding to various seismometers.

The seismometers used to translate seismic waves into a recordable form are usually buried entirely beneath or placed on the surface of the earth. I have found that said seismometers taken in conjunction with the elastic media on which or in which they are planted, form mechanical vibratory systems having definite amplitude and phase characteristics. Due to differences in plant and other factors, said characteristics vary from place to place giving a variation in response. Such variations in response from one point to another may result in erroneous time differences between recorded waves, which differences introduce unsuspected and illusive errors in any computations based thereon. In addition to introducing erratic time differences, seismometers planted under differing conditions may modify the character of received seismic waves to such a degree that they cannot be recognized from one seismometer station to another throughout an area under investigation.

My invention overcomes the above mentioned difficulties by the use of seismometers which give substantially identical response characteristics in the frequency range of interest regardless of minor differences in plant.

Among the objects of my invention are the following: to provide a means and method for recording seismic waves whose recorded arrival times are independent of variations of ground characteristics from one seismometer station to another; to provide a means and method for recording seismic waves in such a manner that the recorded waves will not be substantially affected by the interaction of the seismometers and the ground; to provide a means and method for recording seismic waves from a given horizon in such a manner that the recorded characteristics of corresponding waves will remain substantially unaffected by variations in seismometer plant from one receiving station to another.

My invention possesses numerous other objects and features of advantage, some of which, together with the foregoing, will be set forth in the following description of specific apparatus embodying and utilizing my novel method. It is therefore to be understood that my method is applicable to other apparatus, and that I do not limit myself, in any way, to the apparatus, of the present application, as I may adopt various other apparatus embodiments, utilizing the method, within the scope of the appended claims.

Referring to the drawing:

Fig. 1 is a schematic representation of a vertical section of the earth to which a typical setup used in seismic exploration is applied.

Fig. 2 is a graph illustrating how a seismometer modifies the motion of the earth which it contacts.

Figs. 3, 4 and 5 are schematic diagrams of various seismometer plants which may be used in translating seismic waves.

In Fig. 1 I have represented schematically a vertical section through the earth U and a simple setup used to explore the subsurface. W represents the weathered layer, S the surface of the earth, and B a reflecting horizon. As shown, four spaced seismometers $R_1$, $R_2$, $R_3$, and $R_4$, are placed on the surface to receive seismic waves. Said seismometers are connected to separate amplifiers $A_1$, $A_2$, $A_3$, and $A_4$ the output of which lead to a multiple element oscillograph O. When a charge E placed at the bottom of a shot hole H is detonated by closing key K of a blaster, seismic waves are propagated outwardly in all directions from the shot hole. Some of the waves travelling outward from the charge E are refracted upward from the bottom of the weathered layer W and reach the receptors $R_1$, $R_2$, $R_3$, and $R_4$ after travelling over paths $p_1$, $p_2$, $p_3$, and $p_4$. Other waves follow paths $r_1$, $r_2$, $r_3$, and $r_4$ over which waves reflected from the horizon B travel.

If the dip of bed B lies wholly in the vertical section shown in the drawing, it can be proved that the dip $\theta$ of the bed is given by $$\sin \theta = \frac{V \Delta T}{X} \text{ approximately}$$

where V = average wave velocity over paths in question
X = distance between end seismometers $R_1$ and $R_4$
$\Delta T$ = difference in time required for waves reflected from B to reach end seismometers $R_1$ and $R_4$ from the generating point E.

The accuracy with which the dip $\theta$ can be determined depends to a large extent on the accuracy with which $\Delta T$ can be measured. To increase the accuracy of subsurface determinations weathering corrections are usually applied. Weathering corrections are usually made by comparison of first break times and hence do not take into account the difference in frequency characteristics of first arrivals and reflected waves.

The first break times determined for wave trains arriving at different seismometers correctly represent the relative times at which the initial portions of the wave trains arrive at the respective seismometers. But due to phase and amplitude distortion arising by virtue of variations in plant of seismometers, reflected waves of like character arriving at such seismometers may be modified in phase and form in different ways. Weathering corrections based on first breaks are therefore inadequate in that they fail to take into account variations in modification of wave travel times due to variations of the reaction of the seismometers on the ground at various seismometer stations. With my invention I overcome the above mentioned difficulty by eliminating differences in distortion due to variations in seismometer plants.

I have found that the response of a seismometer to ground motion depends on many factors including ground characteristics, seismometer weight, and type of plant; and that a seismometer may modify the characteristics of ground motion to such an extent that identical seismic waves acting on seismometers of different weights or utilizing different plants may produce wholly dissimilar records. I have found further that such dissimilarity of records is less pronounced as the seismometer-ground contact area is increased and may be almost entirely eliminated by using very light weight seismometers.

Fig. 2 represents graphically the manner in which ground motion is modified by the interaction of the ground and a seismometer placed in contact therewith as in Fig. 3.

Let $v_0$ represent true ground motion, that is the ground motion that would exist at a point on the earth's surface in the absence of any measuring instrument used to detect said ground motion. Let $v$ represent the actual motion of the ground as indicated by a seismometer placed in contact with the earth at the point in question. Then the ratio of the disturbed to the undisturbed velocity is $$\frac{v}{v_0} = A e^{-i\theta}$$

The values of $A$ and $\theta$ vary with frequency in a manner such as that illustrated by the graphs of Fig. 2. The amplitude characteristic $A$ and the phase characteristic $\theta$ may be determined by means of the method given by Harold W. Washburn in his copending application Serial No. 286,653, filed July 26, 1939. Curves $A$ and $\theta$ may be regarded as the seismometer response.

From these curves it will be observed that in the neighborhood of the peak frequency $f_0$ the observed ground velocity $v$ may be much greater than the "true" ground velocity $v_0$. At high frequencies the observed velocity may be less than the "true" velocity. At low frequencies the ground motion is not seriously modified by the presence of the seismometer. It will also be noticed that the observed ground velocity may lag the "true" ground velocity to quite an extent at high frequencies.

In Figs. 3, 4 and 5, I have respresented several different ways of planting a seismometer. In Fig. 3 the seismometer is placed on the ground; in Fig. 4 it is partially buried in the ground with no soil covering it; and in Fig. 5 the seismometer is buried completely. I have found that the type of plant represented in Fig. 4 gives a higher value of peak frequency $f_0$ and a flatter amplitude characteristic than that represented by Fig. 3. The type of plant represented by Fig. 5 generally results in a very complex response curve which is difficult to reproduce from one plant to another.

In the case of Fig. 3, I have found that the frequency at which the peak $f_0$ occurs, depends on the type of ground in which the seismometer response is measured, $f_0$ increasing with the stiffness of the ground; that the peak frequency $f_0$ also increases as the seismometer mass is decreased, and is substantially independent of the base area of the seismometer; and that the characteristic curve $A$ is sometimes flattened by increasing the base area of the seismometer.

I have found that one sure way to produce uniform response from one seismometer plant to another is to use light weight seismometers. For this purpose I prefer to use seismometers having base areas ranging from about three to thirty square inches. By using seismometers of small base area the design of light weight seismometers is simplified. While larger base areas than 30 square inches are useful under some conditions, under others such large areas are detrimental in that they make it difficult to obtain good and uniform contact with the ground. In particular, larger base areas are suitable on soft ground but are difficult to use on hard ground.

According to my invention I utilize seismometers of such weight that the frequency $f_0$ of maximum sensitivity to reflected waves due to the seismometer earth mechanical interaction of the earth and the seismometers lies above the frequency range of seismic waves when planted on or in different types of soil usually encountered in seismic prospecting.

By using a seismometer weighing less than substantially three pounds, but preferably however less than two or even one pound, I am able to produce a high peak frequency $f_0$ lying outside the range of reflected seismic waves. I have found that seismometers of such weights produce peak frequencies which lie above the useful range of seismic wave frequencies in both soft and hard ground. In this manner I obtain a seismometer response which, in the frequency range of reflected seismic waves, is substantially independent of variations of ground characteristics from one seismometer station to another.

By my method I am able to produce records of seismic waves which are substantially free from uncontrolled amplitude or phase distortion arising from differences in ground characteristics from one seismometer station to another. Accordingly I am able to produce records which are more uniform from trace to trace, and in which the time of arrival of waves is substantially independent of surface characteristics.

I claim:

1. In apparatus for seismic prospecting, means for generating seismic waves and means spaced therefrom for receiving said waves after reflection from subsurface strata comprising a seismometer weighing less than substantially three pounds and whose frequency of maximum response lies above the frequency range of seismic waves employed in seismic prospecting.

2. In a seismic prospecting system, a combination which comprises means for generating seismic waves in the earth and a seismometer weighing less than substantially three pounds in contact with the earth, whereby the maximum sensitivity of the seismometer due to its mechanical interaction with the earth is attained for waves having a frequency in excess of the frequency of reflected seismic waves generated by said means.

3. In a seismic prospecting system, a combination which comprises means for generating seismic waves in the earth, a plurality of seismometers contacting the earth at differently spaced points from said generating means for receiving a set of seismic waves after reflection from subsurface strata, each said seismometer weighing less than substantially three pounds, whereby the maximum sensitivity of each said seismometer due to its mechanical interaction with the earth is attained for waves having a frequency in excess of the frequency of reflected waves generated by said means and whereby a related group of waves generated simultaneously at said source can be received at said spaced seismometers and translated into corresponding recordable waves without substantial unsystematic variations in distortion in the reproduction of the received seismic waves from point to point due to differences in the mechanical interaction between said seismometers and the earth.

4. A seismic prospecting system in accordance with claim 3 wherein each of said seismometers is partially buried in the earth with no soil covering it.

5. In a method of seismic prospecting involving the artificial generation of seismic waves in the earth, the transmission of said waves through a portion of the earth, the reception of said waves by a seismometer in contact with the earth and the recording of received waves lying within a predetermined frequency range, the improvement which comprises regulating the interaction of the seismometer and the earth by proportioning the weight of the seismometer with respect to the mechanical characteristics of the earth in contact with the seismometer to make the seismometer most sensitive to seismic waves having a frequency higher than those of the recorded waves.

6. In a method of seismic prospecting involving the artificial generation of seismic waves in the earth, the reflection of said waves from a stratum in the earth, the reception of reflected waves by a seismometer in contact with the earth and the recording of the reflected waves lying within a predetermined frequency range, the improvement which comprises regulating the interaction of the seismometer and the earth by proportioning the weight of the seismometer with respect to the mechanical characteristics of the earth in contact with the seismometer to make the seismometer most sensitive to seismic waves having a frequency higher than those of the recorded reflected waves.

HAROLD F. WILEY.